US011110843B2

(12) United States Patent
Reitnouer

(10) Patent No.: US 11,110,843 B2
(45) Date of Patent: Sep. 7, 2021

(54) ANTI-TORSION STRUCTURE FOR AN A-FRAME HAULING TRAILER

(71) Applicant: Miles A. Reitnouer, Birdsboro, PA (US)

(72) Inventor: Miles A. Reitnouer, Birdsboro, PA (US)

(*) Notice: Subject to any disclaimer, the term of this patent is extended or adjusted under 35 U.S.C. 154(b) by 0 days.

(21) Appl. No.: 16/855,541

(22) Filed: Apr. 22, 2020

(65) Prior Publication Data

US 2020/0247301 A1 Aug. 6, 2020

Related U.S. Application Data

(63) Continuation of application No. 15/946,304, filed on Apr. 5, 2018, now Pat. No. 10,688,904.

(51) Int. Cl.
*B60P 3/00* (2006.01)
*B62D 21/20* (2006.01)
*B62D 53/06* (2006.01)

(52) U.S. Cl.
CPC .............. *B60P 3/002* (2013.01); *B62D 21/20* (2013.01); *B62D 53/06* (2013.01)

(58) Field of Classification Search
CPC .......... B60P 3/002; B62D 21/20; B62D 53/06
See application file for complete search history.

(56) References Cited

U.S. PATENT DOCUMENTS 3,622,026 A 11/1971 Tornheim
4,626,017 A 12/1986 Robertson
(Continued)

FOREIGN PATENT DOCUMENTS

CN 205591570 9/2016
DE 7920493 U1 10/1979
(Continued)

OTHER PUBLICATIONS

"Floatliner", Load-Lifter Sol., http://www.loadlifter-solutions.com/pages/floatliner/, Mar. 22, 2018.
(Continued)

*Primary Examiner* — Kevin Hurley
*Assistant Examiner* — Marlon A Arce
(74) *Attorney, Agent, or Firm* — Caesar Rivise, PC

(57) ABSTRACT

A drop-deck trailer for hauling heavy loads (e.g., jumbo glass panes) positioned on each side of the drop-deck and which minimizes trailer twisting/leaning is provided. The drop deck includes a plurality of transversely-mounted A-frames that are coupled through an anti-torsion structure (ATS) to each other and to at least two trailer main beams at an elevated front deck and at a rear portion of the drop-deck for transferring the load from each side of the trailer and into the at least two main beams. The ATS includes tie bars for connecting the tops of the A-frames together, a front support for connecting the forward-most A-frame to the main beams and an end support for connecting the rear-most A-frame to the main beams. The ATS minimizes twisting/leaning of the trailer without adding any significant weight to the trailer itself. This permits the transport of increased payload on the trailer, including a continuous tarp for covering the payload during transport.

14 Claims, 7 Drawing Sheets

(56) References Cited

U.S. PATENT DOCUMENTS

| | | | |
|---|---|---|---|
| 4,688,976 A | 8/1987 | Rowley et al. | |
| 5,209,540 A | 5/1993 | Metler | |
| 5,383,950 A | 1/1995 | Hashemi et al. | |
| 6,709,207 B1 | 3/2004 | Forbes | |
| 6,920,829 B2 | 7/2005 | Forbes et al. | |
| 6,935,668 B1 * | 8/2005 | Summers | B60P 3/002 280/143 |
| 6,962,114 B1 | 11/2005 | Forbes | |
| 6,983,702 B2 | 1/2006 | Forbes | |
| 7,607,873 B2 | 10/2009 | Wehrli et al. | |
| 9,463,937 B2 | 10/2016 | Piccininno et al. | |
| 10,518,688 B2 | 12/2019 | Vander Pol et al. | |
| 10,688,904 B2 * | 6/2020 | Reitnouer | B60P 3/002 |
| 10,780,924 B2 * | 9/2020 | Smith | B62D 21/20 |
| 2003/0173314 A1 | 9/2003 | Knoll et al. | |
| 2017/0217353 A1 | 8/2017 | Vander Pol et al. | |

FOREIGN PATENT DOCUMENTS

| | | |
|---|---|---|
| DE | 3842324 | 11/1989 |
| DE | 202009004415 U1 | 6/2009 |
| GB | 2334943 | 9/1999 |
| SU | 1355518 | 11/1987 |

OTHER PUBLICATIONS

"Semi-Trailers-Floatmax" Faymonville, http://www.faymonville.com/vehicles.aspx?id=101, Mar. 22, 2018.

"Avenger Curtain Body Glass Transport Trailer", www.myglasstruck.com, http://www.myglasstruck.com/product/avenger-curtain-body-flat-bed-glass-transport-trailer, p. 3 of 6, Mar. 22, 2018.

"Flat Glass Hauling Trailers", Glass Racking Co., http://www.theglassrackingcompany.com/us_glass_racking/large_trucks_and_trailers/gooseneck_trailers, Mar. 22, 2018.

"ELT++", Van Huet, http://www.vanhuet.com/van-huet-concepts/elt, p. 2 of 3, Mar. 22, 2018.

* cited by examiner

US 11,110,843 B2

ANTI-TORSION STRUCTURE FOR AN A-FRAME HAULING TRAILER

CROSS-REFERENCE TO RELATED APPLICATIONS

This Continuation application claims the benefit under 35 U.S.C. § 120 of application Ser. No. 15/946,304 filed on Apr. 5, 2018 entitled "ANTI-TORSION STRUCTURE FOR AN A-FRAME HAULING TRAILER" and whose entire disclosure is incorporated by reference herein.

BACKGROUND OF THE INVENTION

The present invention relates trailers and more particularly to a trailer that uses an anti-torsion structure connected to A-frames for hauling heavier loads (e.g., jumbo glass panes) on both sides of the trailer and to reduce twisting of the trailer where the loads are non-symmetrical and without significantly adding to the trailer's weight.

FIG. 1 depicts a prior art conventional trailer 2 using a drop-deck design including side rails 4 with a plurality of transversely positioned A-frames 6 for hauling jumbo glass panes 8 (FIG. 2). The trailer 2 comprises main beams 12A/12B that support an elevated front deck 13 and which run the full length of the trailer 2 culminating in a rear portion 14 that rests on a wheel system 15. The A-frames 6 straddle and are mounted to the main beams 12A/12B and are connected to the main beams 12A/12B and to feet 10 on each side of the trailer 2. The side rails 4 are connected to the feet 10 on each side of the trailer 2. Each foot 10 comprises a resilient (e.g., rubber element) mount 10A for receiving the edges of the glass panes thereon. In particular, as shown in FIG. 2, the jumbo glass panes 8 are positioned on the mounts 10A and against the inclined sides of the A-frames 6.

However, in many cases, the jumbo glass panes to be transported are provided such that they cannot be separated and evenly distributed on both sides of the trailer. As such, as shown most clearly in FIG. 2, due to the heavy weight and the non-symmetrical arrangement of these jumbo glass panes 8 on each side of the trailer 2, this causes the trailer 2 to twist or lean (indicated by arrow 11) and the drop-deck deflection can be as much as 2"-3" downward. This twisting/leaning 11 not only makes the trailer unstable but it also creates another dangerous situation of possible contact with the roadway or items in the roadway during travel. Furthermore, because of this twisting/leaning 11 (viz., compare the axis 11A normal to the trailer when no jumbo glass panes 8 are present to the axis 11B normal to the trailer 2 when the jumbo glass panes 8, loaded in a non-symmetrical manner, are present), the lower ends 8A of some of the jumbo glass panes 8 are out of contact with the trailer mounts 10 (see gap G in FIG. 3) which creates another unsafe condition, as these particular panes are not being supported properly.

One solution is to use heavier main beams 12A/12B in the trailer 2 that reduce the twisting of the drop-deck design when the heavy and non-symmetric payload 8 is present. However, using heavier main beams 12A/12B forces trailer owners to reduce the amount of payload they can carry in order to comply with weight restrictions set forth in roadway regulations. Moreover, jumbo glass pane manufacturers insist that their panes be covered during transport. A large continuous tarp is a preferred method of covering the payload during transport but that type of tarp can have significant weight itself and in order to transport a particular payload of jumbo glass panes, the trailer owner is forced to forego the use of the continuous tarp in order to make the delivery while complying with the roadway regulations. As such, a more cumbersome and time-consuming use of individual covers over the glass panes themselves is required.

Another solution for hauling glass panes on a trailer is disclosed in German Utility Model Patent No. DE 7920493 (Vereinigte Glaswerke GmbH) entitled "Low Loader for the Transport of Large Glass Packs". In particular, DE 7920493 discloses a trailer for hauling glass panes in a vertical orientation, centered on the trailer deck, using a truss structure. However, as such, DE 7920493 explicitly avoids loading and transporting the glass pane payload on the sides of the trailer deck and avoids positioning the glass panes against any slanted portion of any A-frames.

Thus, in view of the foregoing, there still remains a need for trailer that can haul such heavy and non-symmetrical loads (e.g., jumbo glass panes) on both sides of a drop-deck trailer using A-frames with minimal twisting/leaning and without significantly adding to the trailer weight itself.

All references cited herein are incorporated herein by reference in their entireties.

BRIEF SUMMARY OF THE INVENTION

A trailer for hauling payload (e.g., jumbo pane glass, etc.) positioned on opposite sides of the trailer which experiences minimized twisting is disclosed. The trailer comprises: a trailer body having at least two main beams that support an elevated front deck and a drop deck, wherein the drop deck has a rear portion positioned over a wheel system; a plurality of A-frames transversely positioned on the drop deck; and an anti-torsion structure that couples the plurality of A-frames together and to the at least two main beams at the elevated front deck and at the rear portion, wherein the anti-torsion structure minimizes twisting of the drop deck, and without increasing the weight of the at least two main beams, when the payload is positioned on the drop deck and against sides of the plurality A-frames.

A method for forming a trailer that is configured to haul payload (e.g., jumbo pane glass, etc.) positioned on opposite sides of the trailer while experiencing minimized twisting is disclosed. The method comprises: forming a trailer body having at least two main beams that support an elevated front deck and a drop deck, and wherein the drop deck has a rear portion positioned over a wheel system; positioning a plurality of A-frames transversely on the drop deck; and coupling the plurality of A-frames together and to the at least two main beams at the elevated front deck and at the rear portion using an anti-torsion structure, and wherein the anti-torsion structure minimizes twisting of the drop deck, and without increasing the weight of the at least two main beams, when the payload is positioned on the drop deck and against sides of the plurality of A-frames.

An anti-torsion structure configured for minimizing the twisting of a trailer that hauls payload (e.g., jumbo pane glass, etc.) positioned on opposite sides of the trailer is disclosed. The trailer has a body formed of at least two main beams that support an elevated front deck and a drop deck and wherein the drop deck has a rear portion positioned over a wheel system and wherein the drop deck includes a plurality of A-frames positioned transversely on the drop deck and against which the payload is positioned. The anti-torsion structure comprises: a plurality of bars that are connected between tops of the plurality of A-frames; a first member that is connected to the at least two main beams at the elevated front deck on a first end of the first member and is connected to a top of a forward-most A-frame on a second end of the first member; and a second member that is connected to the at least two main beams at the rear portion on a first end of the second member and is connected to a top of a rear-most A-frame on a second end of the second member.

A method for minimizing the twisting of a trailer that hauls payload (e.g., jumbo pane glass, etc.) positioned on opposite sides of the trailer is disclosed. The trailer includes a body formed of at least two main beams that support an elevated front deck and a drop deck and wherein the drop deck has a rear portion positioned over a wheel system and wherein the drop deck includes a plurality of A-frames positioned transversely on the drop deck and against which the payload is positioned. The method comprises: coupling the A-frames together by connecting a plurality of bars between tops of the plurality of A-frames; connecting a first member to the at least two main beams at the elevated front deck on a first end of the first member and connecting a second end of the first member to a top of a forward-most A-frame; and connecting a second member to the at least two main beams at the rear portion on a first end of the second member and connecting a second end of the second member to a top of a rear-most A-frame.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
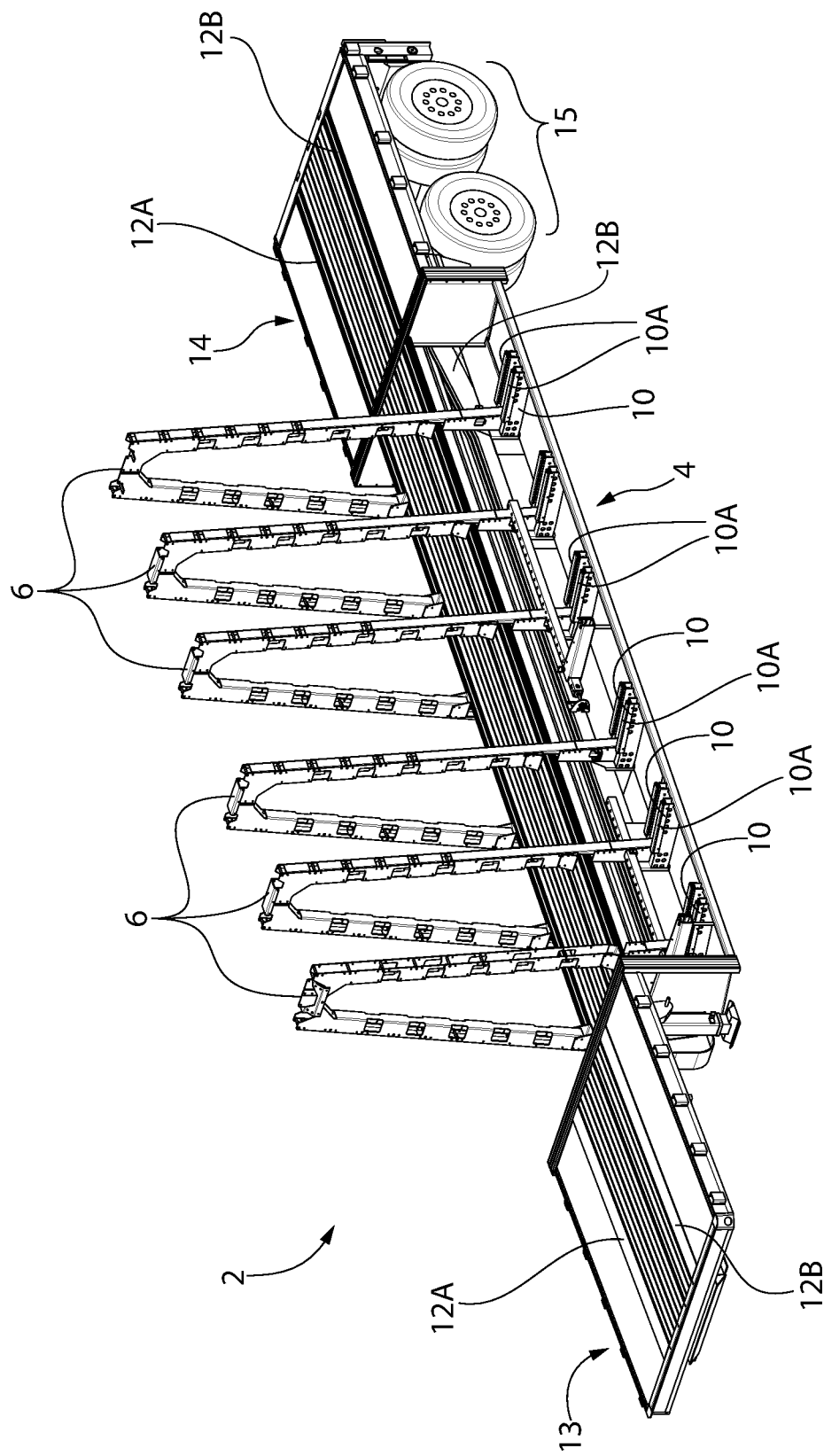
FIG. 1 is an isometric view of an exemplary prior art conventional jumbo glass pane hauling trailer.
Figure 2:
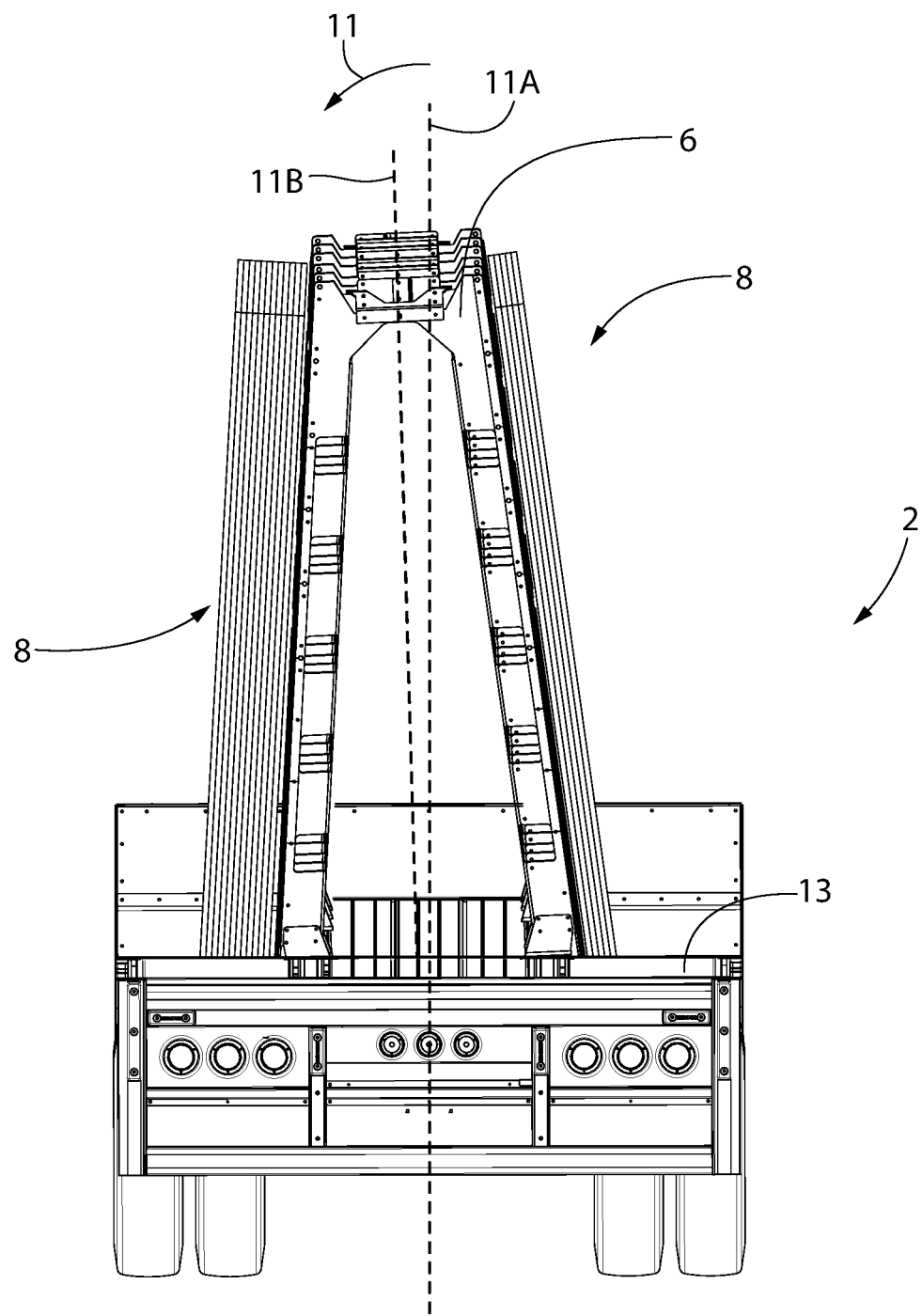
FIG. 2 is an end view of the conventional jumbo glass pane hauling trailer of FIG. 1 showing the drop-deck twisting with the panes of glass loaded non-symmetrically on each side of the trailer.
Figure 3:
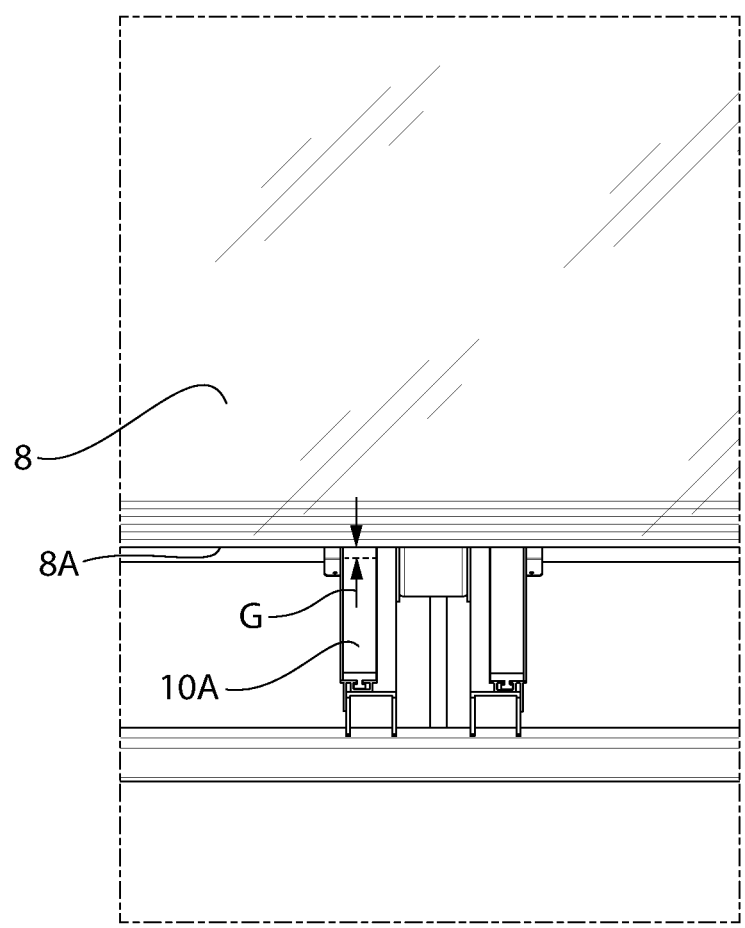
FIG. 3 is a partial view of the bottom edges of jumbo glass panes showing them being "out of contact" (viz., gap G) with a trailer mount on the drop-deck of the conventional trailer of FIGS. 1-2 due to twisting/leaning of the drop-deck.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

Figure 4:
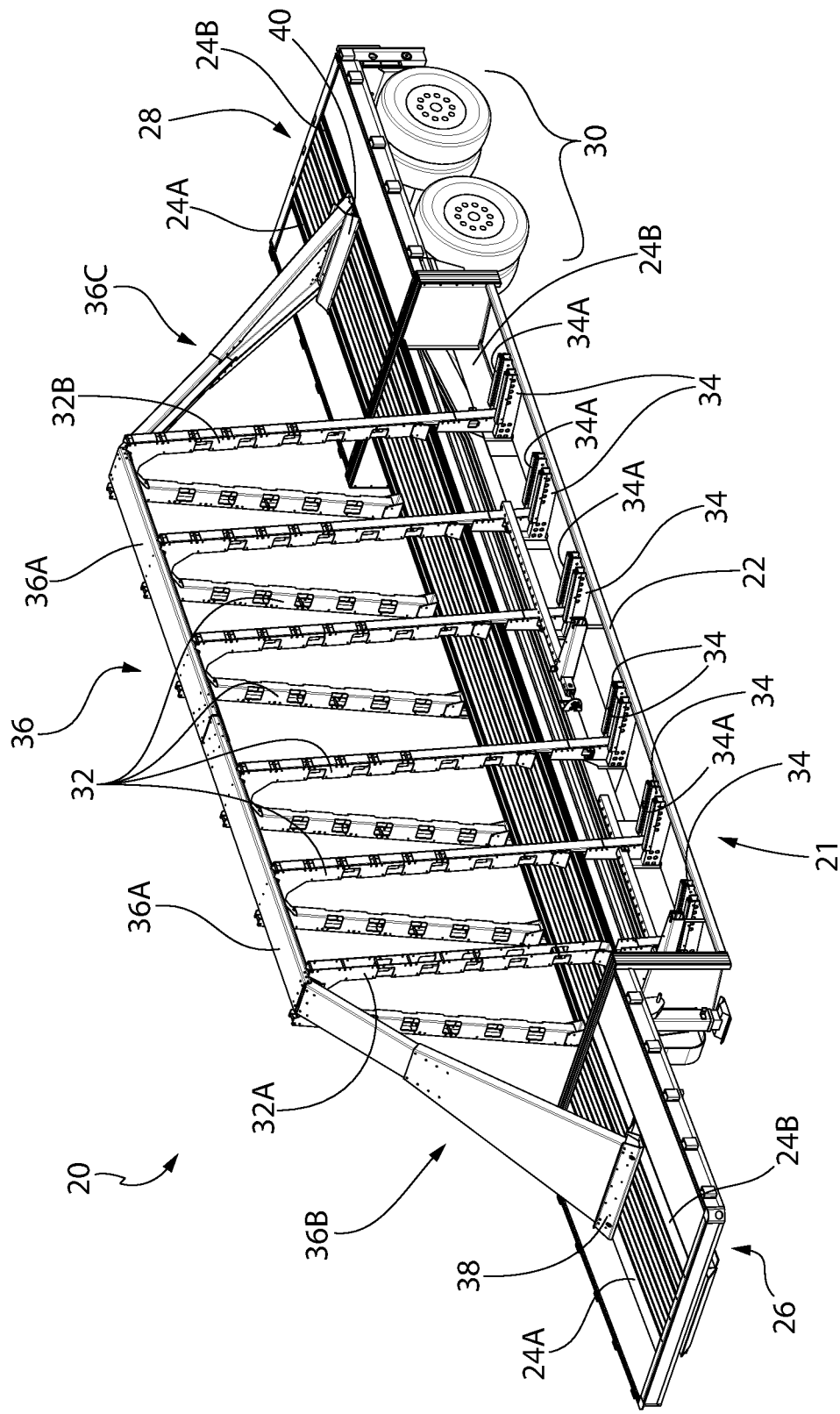
FIG. 4 is an isometric view of the present invention showing the A-frames being connected together with tie bars, a front support and an end support which form the anti-torsion structure installed on the trailer.

FIG. 4 depicts the anti-torsion A-frame hauling trailer 20 of the present invention using a drop deck configuration 21 including side rails 22. The trailer 20 comprises a trailer body having a pair of main beams 24A/24B that support an elevated front deck 26 and which run the full length of the trailer 20 culminating in a rear portion 28 that rests on a wheel system 30. A plurality of A-frames 32 straddle and are mounted transversely to the main beams 24A/24B and are connected to the main beams 24A/24B and to feet 34 on each side of the trailer 20. The side rails 22 are also connected to the feet 34 on each side of the trailer 2. Each foot 34 comprises a resilient (e.g., rubber element) mount 34A for receiving the edges of the glass panes 8 thereon. The heavy payload 8 (e.g., jumbo glass panes, etc.) is positioned on the mounts 34A and against the inclined sides of the A-frames 32. The A-frames 32 are coupled together via an anti-torsion structure (ATS) 36 that minimizes the twisting/leaning of the drop-deck 21 when hauling the heavy payload 8, and in a non-symmetrical manner (see FIG. 7A), thereon. In particular, the ATS 36 comprises a plurality tie bars 36A (see FIGS. 4-6) that connect the tops of the A-frames 32 together (using fasteners such as, but not limited to, screws or bolts/nuts, rivets, etc.), a front support 36B that is coupled between the forward-most A-frame 32A and the main beams 24A/24B at the front deck 26 (see also FIG. 7), and a back support 36C that is coupled between the end-most A-frame 32B and the main beams 24A/24B at the rear portion 28. The ATS 36 transfers the load of the heavy and non-symmetrical payload 8 (e.g., jumbo glass panes, slate panels, etc.) to the main beams 24A/24B and thereby minimizes twisting/leaning of the drop deck 21 (e.g., ⅝"). Although less preferred, the plurality of tie bars 36A can also be implemented using a single element, such as single tie bar connected at different locations to each A-frame 32.

It should be understood that term "bar", "bars", "tie bars" for 36A used in this Specification is by way of example only and that any rigid structure for coupling the tops of the A-frames 32 together is covered by the terms "bar", "bars", "tie bars".

Figure 5:
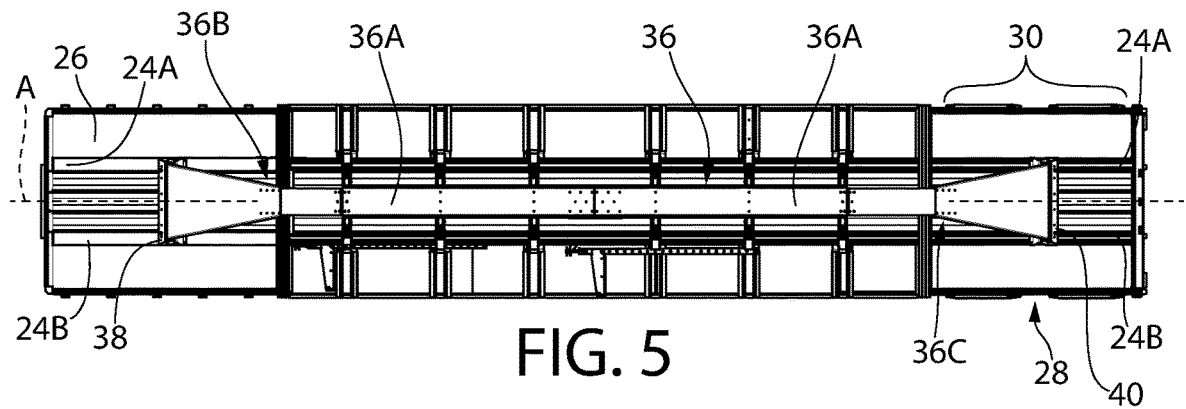
FIG. 5 is top view of the present invention, showing the tie bars, front support and end support of the anti-torsion structure installed on the trailer.

The ATS 36 is arranged along a longitudinal axis A of the trailer 20 (FIG. 5).

The resilient mounts 34A typically comprise a rubber material or equivalent to form a pliable resting surface for the heavy payload 8 (e.g., jumbo glass panes, slate panels, etc.). A resilient mount 34A is located on each foot 34 that is present on each side of an A-frame 32 at the frame's bottom.

Figure 8:
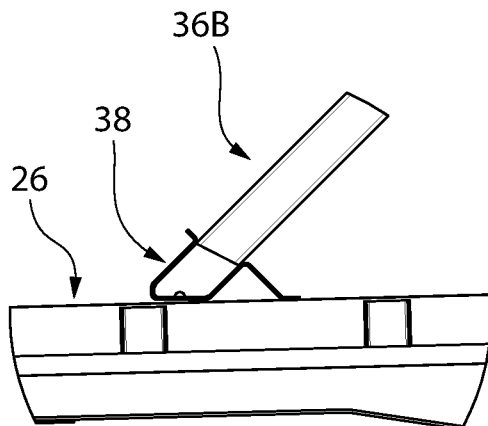
FIG. 8 is a partial view of the front support and the front deck of FIG. 6 showing an exemplary connector used for coupling the lower end of the front support to the main beams at the elevated front deck.
Figure 9:
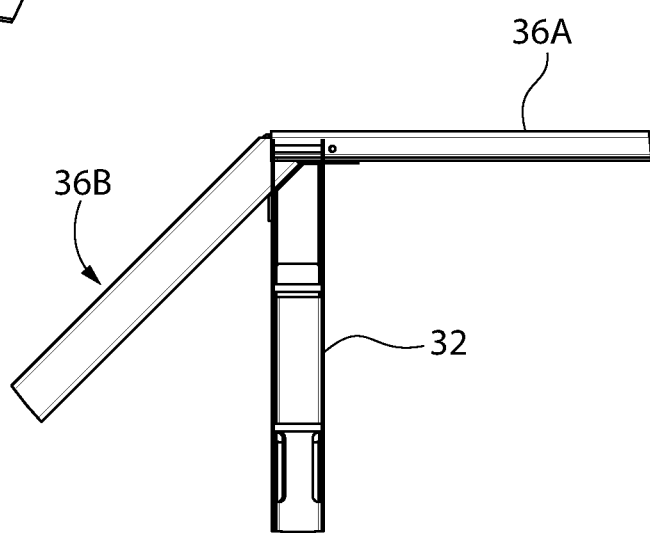
FIG. 9 is a partial view of the front, a tie bar and an A-frame of FIG. 6 showing an exemplary connection used for coupling the upper end of the front support to the forward-most A-frame.
Figure 10:
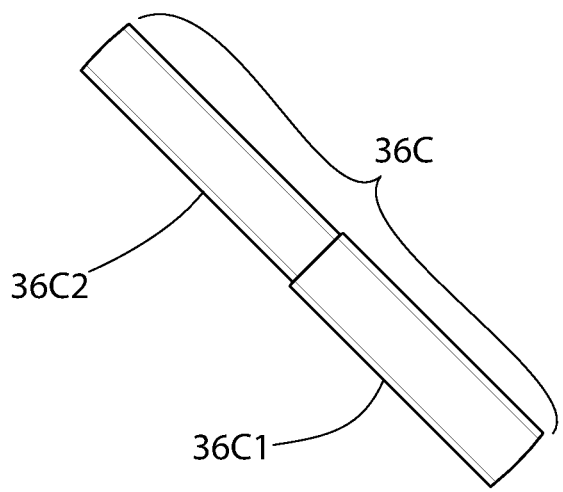
FIG. 10 is a partial view of the back support of FIG. 6 showing an exemplary two-part assembly of the back-support.

The front support 36B and the back support 36C each comprise a trapezoidal shape, being wider at their base to connect to the main beams 24A/24B at the front deck 26 (for the front support 36B) and to connect to the main beams 24A/24B at the rear portion 28 (for the back support 36C) and being shorter at their tops to connect to the forward-most A-frame 32A and to the back-most A-frame 32B, respectively. Because the front support 36B and back support 36C are identical, FIGS. 8-10 are applicable to both supports 36B/36C and their respective connections to the main beams 24A/24B at the front deck 26 and to the main beams 24A/24B at the rear portion 28 and to the tops of their respective A-frames 32A/32B.

Figure 6:
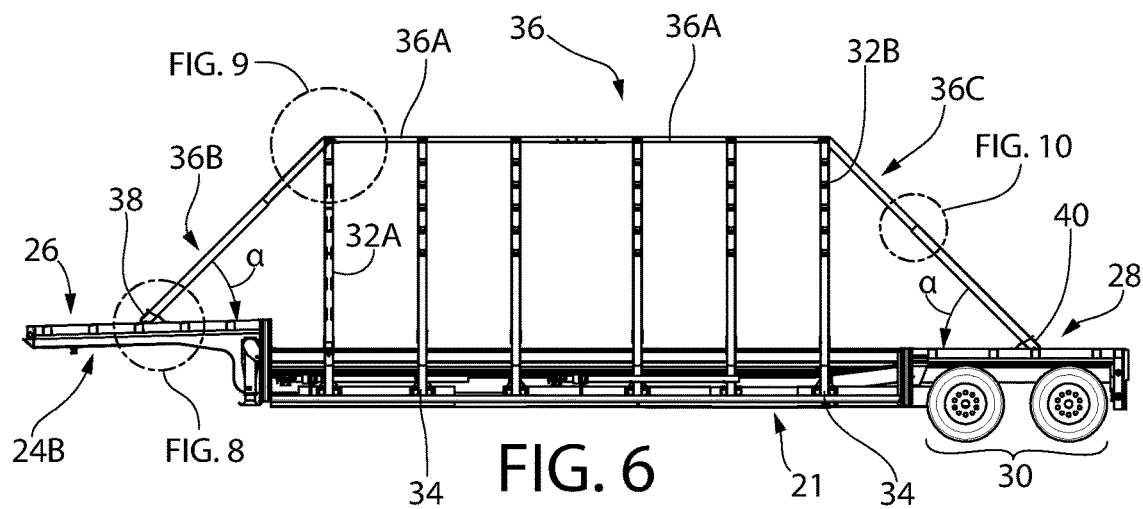
FIG. 6 is a side view of the present invention also showing the tie bars, front support and end support of the anti-torsion structure installed on the trailer.
Figure 7:
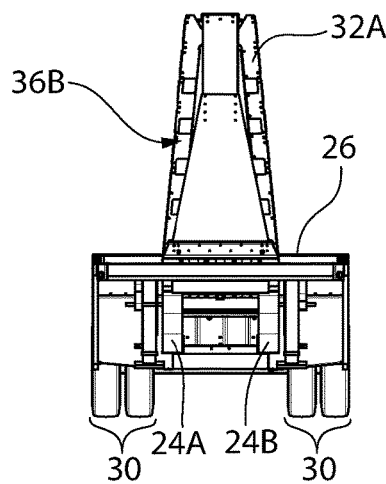
FIG. 7 is a front view of the present invention showing the front support of the anti-torsion structure installed on the trailer.
Figure 7A:
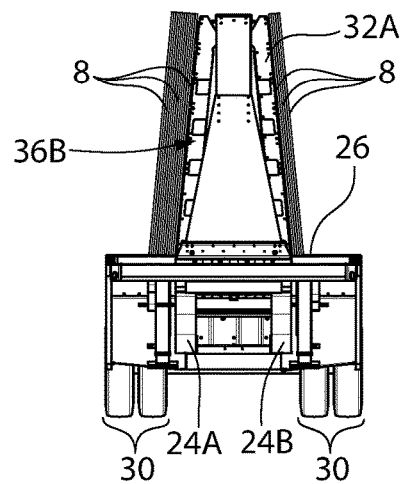
FIG. 7A is a front view of the present invention, similar to FIG. 7, but showing an exemplary payload, e.g., jumbo glass panes, positioned non-symmetrically on each side of the drop-deck with minimal or no twisting of the drop deck.

As can be see most clearly in FIGS. 4 and 6, the front support 36B and the end support 36C are angled a (e.g., 45°) between the top of their respective A-frame 32 and the main beams 24A/24B. The tie bars 36A and support bars 36B and 36C may comprise aluminum, or steel or even composite materials.

As mentioned previously, the front support 36B and the back support 36C are coupled to the main beams 24A/24B at the front deck 26 and to the main beams 24A/24B at the rear portion 28, respectively. The may be accomplished using a cleat 38/40 and fasteners (e.g., screws or bolts/nuts, rivets, etc.), as shown in FIGS. 4-8. The upper ends of the front support 36B and the back support 36C are coupled to their respective A-frames 32A/32B as shown by way of example in FIG. 9. Furthermore, each front support 36B and end support 36C may comprise a two-component construction, namely a lower portion 36C1 and an upper portion 36C2 and fasteners (e.g., screws or bolts/nuts, rivets, etc.), as shown in FIGS. 4-7A and 10. Alternatively, the front support 36B and back support 36C may each comprise a unitary member. Furthermore, the front/back supports 36B/36C (including the two-component construction) may comprise openings or apertures (not shown) to allow for passage of wind/air therethrough when the trailer 20 is in motion to reduce air resistance and assist air flow.

It should be understood that while jumbo glass panes are the typical payload for the present invention 20, these do not in any way limit the scope of the invention. For example, any type of payload that can be positioned on the feet 34 and then leaned against the A-frames 32 is transportable by the trailer 20 of the present invention with minimized twisting. For example, slate panels, wood panels, metal panels, etc. can be positioned against the A-frames 32 of the drop deck 21 portion of the present invention.

Figure 11:
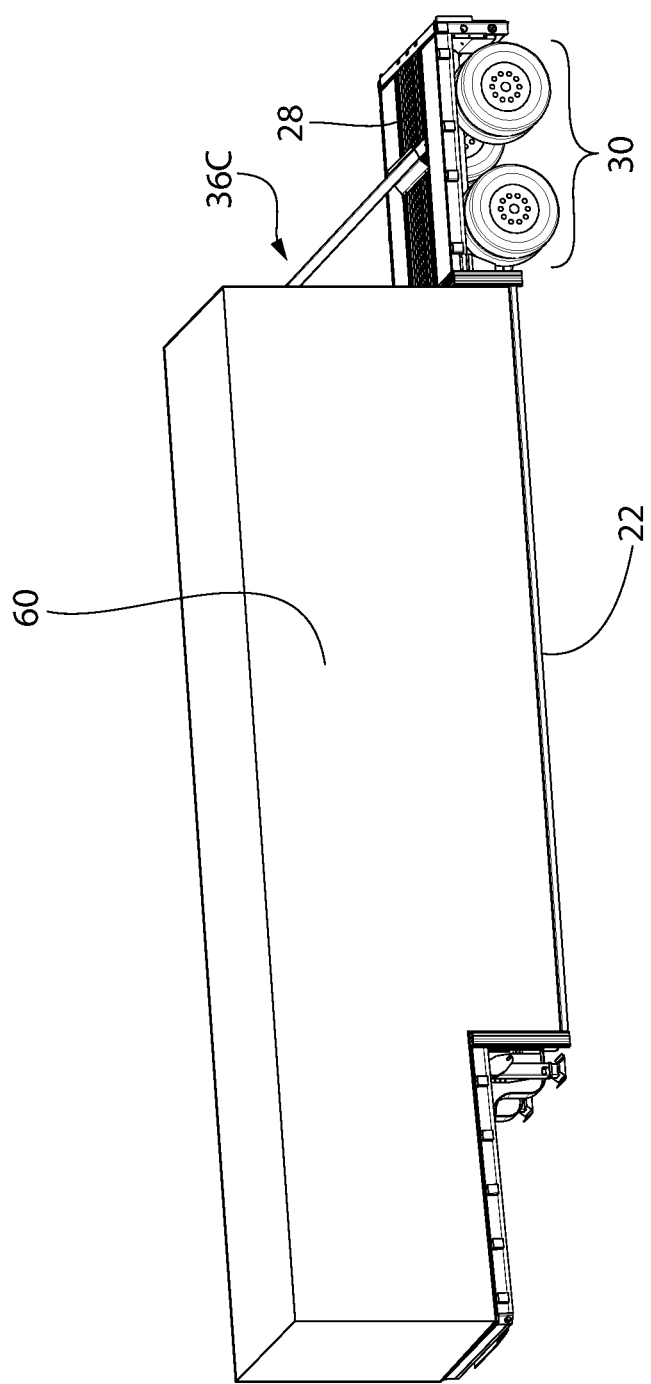
FIG. 11 shows a continuous tarp positioned over the present invention and over the jumbo glass panes loaded on the sides of the drop-deck of the present invention.

Because the ATS 36 does not require increasing the weight/strength of the main beams 24A/24B, this permits the use of a continuous tarp 60 to cover and protect the entire payload (see FIG. 11) during transport. This type of the tarp 60 is preferred by haulers since it is very convenient to deploy and then remove. However, such tarps 60 can weigh in the vicinity of 1800 lbs. which can cause the overall trailer to exceed weight restrictions. As a result, currently, haulers need to use less heavy but more complicated and time-consuming individual coverings for the payload. But because the inventive hauling trailer 20 does not require the use of heavier main beams 24A/24B, the hauler can use the continuous tarp 60 without exceeding weight restrictions.

While the invention has been described in detail and with reference to specific examples thereof, it will be apparent to one skilled in the art that various changes and modifications can be made therein without departing from the spirit and scope thereof.

What is claimed is:

1. A trailer for hauling payload positioned on opposite sides of the trailer which experiences minimized twisting, said trailer comprising:
    a trailer body having at least two main beams that support an elevated front deck and a drop deck, said drop deck having a rear portion positioned over a wheel system, said drop deck comprising side rails on each side thereof;
    a plurality of A-frames transversely positioned on said drop deck and configured for holding the payload thereagainst, each one of said plurality of A-frames having lower ends that extend onto said side rails and are fixedly-secured to said drop deck; and
    an anti-torsion structure comprising:
        a first member that is connected to said at least two main beams at said elevated front deck on one end and is connected to a top of a forward-most A-frame on the other end of said first member;
        a second member that is connected to said at least two main beams at said rear portion on one end and is connected to a top of a rear-most A-frame on the other end of said second member; and
        at least one bar that couples the tops of said plurality of A-frames together; and
        wherein said anti-torsion structure minimizes twisting of said drop deck, and without increasing the weight of said at least two main beams, when the payload is positioned on said drop deck and against sides of said plurality of A-frames.

2. The trailer of claim 1 wherein said anti-torsion structure is aligned along a longitudinal axis of said trailer.

3. The trailer of claim 1 wherein said at least one bar comprises two bars in series connecting said tops of said plurality of A-frames.

4. The trailer of claim 1 further comprising a plurality of feet located on each side of each one of said plurality of A-frames, said plurality of feet configured to receive the payload thereon.

5. The trailer of claim 4 wherein the payload comprises a plurality of jumbo glass panes.

6. The trailer of claim 1 wherein both said first member and said second member are trapezoidally-shaped.

7. The trailer of claim 1 further comprising a continuous tarp for covering the payload positioned on said trailer.

8. An anti-torsion structure configured for minimizing the twisting of a trailer that hauls payload positioned on opposite sides of the trailer, the trailer having a body formed of at least two main beams that support an elevated front deck and a drop deck and wherein the drop deck has a rear portion positioned over a wheel system and including side rails on each side thereof, and wherein the drop deck includes a plurality of A-frames positioned transversely on the drop deck and against which the payload is positioned, said anti-torsion structure comprising:
    at least one bar that connects tops of said plurality of A-frames, each one of the plurality of A-frames having lower ends that extend onto said side rails and are fixedly-secured to the drop deck; and
    a first member that is connected to the at least two main beams at the elevated front deck on a first end of said first member and is connected to a top of a forward-most A-frame on a second end of said first member; and a second member that is connected to the at least two main beams at the rear portion on a first end of said second member and is connected to a top of a rear-most A-frame on a second end of said second member; and wherein said anti-torsion structure minimizes twisting of the drop deck, and without increasing the weight of the at least two main beams, when the payload is positioned on the drop deck and against sides of the plurality of A-frames.

9. The anti-torsion structure of claim 8 wherein said anti-torsion structure is aligned along a longitudinal axis of said trailer.

10. The anti-torsion structure of claim 8 wherein both said first member and said second member are trapezoidally-shaped.

11. The anti-torsion structure of claim 8 wherein said at least one bar comprises two bars in series connecting said tops of said plurality of A-frames.

12. A method for minimizing the twisting of a trailer that hauls payload positioned on opposite sides of the trailer wherein the trailer includes a body formed of at least two main beams that support an elevated front deck and a drop deck and wherein the drop deck has a rear portion positioned over a wheel system and including side rails on each side thereof, and wherein the drop deck includes a plurality of A-frames positioned transversely on the drop deck and against which the payload is positioned, said method comprises:

coupling the A-frames together by connecting at least one bar along tops of the plurality of A-frames and wherein each one of the A-frames have lower ends that extend onto said side rails and fixedly securing the A-frames to the drop deck;

connecting a first member to the at least two main beams at the elevated front deck on a first end of said first member and connecting a second end of said first member to a top of a forward-most A-frame; and connecting a second member to the at least two main beams at the rear portion on a first end of said second member and connecting a second end of said second member to a top of a rear-most A-frame; and wherein said anti-torsion structure minimizes twisting of the drop deck and without increasing the weight of the at least two main beams, when the payload is positioned on the drop deck and against the sides of the plurality of A-frames.

13. The method of claim 12 wherein said plurality of bars, said first member and said second member are aligned along a longitudinal axis of said trailer.

14. The method of claim 12 wherein said step of coupling the A-frames together by connecting at least one bar along tops of the plurality of A-frames comprises connecting two bars in series along said tops of said plurality of A-frames.

* * * * *